United States Patent [19]
Matsuzaki

[11] Patent Number: 5,828,321
[45] Date of Patent: Oct. 27, 1998

[54] LOCATION DETECTING SYSTEM

[75] Inventor: Shin-ichi Matsuzaki, Osaka, Japan

[73] Assignee: Sumitomo Electric Industries, Ltd., Osaka, Japan

[21] Appl. No.: 878,500

[22] Filed: May 5, 1992

[30] Foreign Application Priority Data

Jun. 18, 1991 [JP] Japan ..................................... 3-145900

[51] Int. Cl.⁶ .................................................. G08G 1/123
[52] U.S. Cl. .......................... 340/988; 340/990; 340/996; 701/35
[58] Field of Search ..................................... 340/988, 990, 340/995, 996, 945; 364/449, 439, 424.04, 424.06; 353/12; 434/29, 62, 66, 49, 51; 369/21; 701/35

[56] References Cited

U.S. PATENT DOCUMENTS

| | | | |
|---|---|---|---|
| 4,490,117 | 12/1984 | Parker | 434/49 |
| 4,604,711 | 8/1986 | Benn et al. | 364/424.06 |
| 4,903,211 | 2/1990 | Ando | 340/990 |
| 5,023,791 | 6/1991 | Herzberg et al. | 364/424.04 |
| 5,043,902 | 8/1991 | Yokoyama et al. | 340/988 |
| 5,170,164 | 12/1992 | Lewis | 340/988 |

FOREIGN PATENT DOCUMENTS

3929581 A1  3/1991  Germany  ........................ B64D 45/00

*Primary Examiner*—Brent A. Swarthout
*Attorney, Agent, or Firm*—Lane, Aitken & McCann

[57] ABSTRACT

A location detecting system comprising a sensor unit, a main body having an operating mode consisting of a traveling mode and an simulation mode and including location detecting unit for calculating a current location of a moving body on the basis of data sensed by the sensor unit and further including a navigation controller connected to the location detecting unit, a change-over unit for changing over the operating mode to the traveling mode or the simulation mode, a storage unit detachably connected to the main body, a write unit for storing the data sensed by the sensor unit into the storage unit when the storage unit is connected to the main body and also the main body is in the traveling mode, and a read unit for inhibiting the data sensed by the sensor unit from being supplied to the location detecting unit and instead supplying the data stored in the storage unit to the location detecting unit, when the storage unit is connected to the main body and also the main body is in the simulation mode.

7 Claims, 3 Drawing Sheets

LOCATION DETECTING SYSTEM

FIELD OF THE INVENTION

The present invention relates to a location detecting system which is mounted in a moving body and detects the current location of the moving body.

DESCRIPTION OF THE PRIOR ART

A great variety of vehicle-mounted navigational systems are known as a location detecting system for detecting the location or a moving body. A typical navigational system is one which detects the current location of a vehicle on the basis of the outputs from heading and wheel sensors and displays the detected current location on the road map read out of a road map memory constituted by CD-ROM, etc. The heading sensor comprises a gyro or a magnetic sensor. A navigational system has also been proposed which is capable of directly detecting the current location of a moving body by the use of an absolute location sensor such as a GPS receiver.

For improving such navigational systems or developing a new model, it is necessary to mount an experimental model in a vehicle and to calculate the current location of the vehicle on the basis of sensor data obtained on actual traveling and to examine errors in the result of calculation.

However, since it is extremely troublesome to mount an experimental model in a vehicle and actually drive the vehicle, there is strong demand for sensor data that are obtained under the condition that a vehicle travels actually in a research installation, etc. This is because it can be expected that an improvement or development in a navigational system can be performed for a short period of time, if such sensor data are available.

In addition, when some problems arose in a navigational system at the stage of the development, or when a repair of a navigational system was needed after it was actually mounted in a vehicle, the operating state of the navigational system can be grasped accurately if sensor data obtained on actual traveling can be supplied to the navigational system. Consequently, a change of design in the stage of development or a repair after a system was mounted in a vehicle can be performed with ease.

It is an important object of the present invention to provide an improved location detecting system that includes a memory capable of storing sensor data obtained on actual traveling and also outputting the stored data as sensor data.

SUMMARY OF THE INVENTION

The foregoing object is accomplished in accordance with the present invention by providing a location detecting system comprising sensor means and a main body having an operating mode consisting of a traveling mode and an simulation mode. The main body includes location detecting means for calculating a current location of a moving body on the basis of data sensed by the sensor means and further includes a navigation controller connected to the location detecting means. The location detecting means further comprises change-over means for changing over the operating mode to the traveling mode or the simulation mode, storage means detachably connected to the main body, write means, and read means. The write means stores the data sensed by the sensor means into the storage means when the storage means is connected to the main body and also the main body is in the traveling mode. The read means inhibits the data sensed by the sensor means from being supplied to the location detecting means and instead supplies the data stored in the storage means to the location detecting means, when the storage means is connected to the main body and also the main body is in the simulation mode.

The moving body travels actually in such a condition that the operating mode was changed over to the traveling mode by the change-over means and that the memory unit was connected to the main body. As the moving body travels, data are sensed by the sensor means. The sensed data are then supplied to the location detecting means, which calculates the current location of the moving body. At the same time, the sensed data are stored into the memory unit.

When, on the other hand, the operating mode was changed over to the simulation mode with the memory unit connected to the main body, the sensed data of the sensor means are inhibited from being supplied to the location detecting means. Instead, the data stored in the memory unit are supplied to the location detecting means, which calculates the current location of the vehicle on the basis of the stored data. Accordingly, in the simulation mode, it is not necessary that the moving body travels actually, and the current location of the moving body can be simulated indoors.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
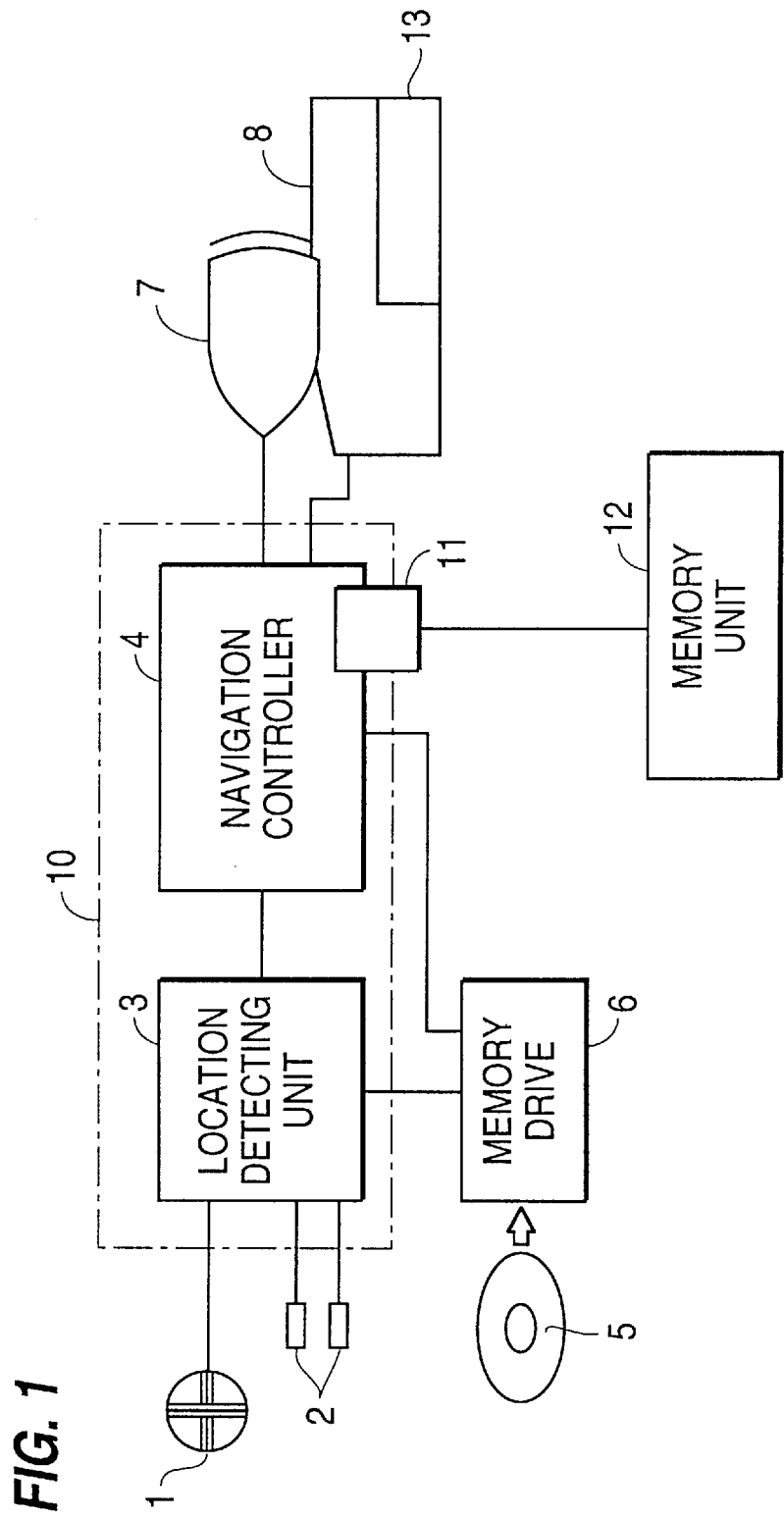
FIG. 1 is a block diagram showing a navigational system according to the present invention.

Referring to FIG. 1, there is shown a preferred embodiment of a navigational system in accordance with the present invention. This navigational system is mounted in a moving body such as a vehicle and provided with a gyro I for sensing the turning angle of a vehicle and wheel sensors 2 for sensing the speed of a vehicle. The output of the gyro 1 and the outputs of the wheel sensors 2 are supplied to a location detecting unit 3, in which a change in the heading of the vehicle is obtained by integrating the output of the gyro I over a predetermined period of time and in which a distance traveled by the vehicle is obtained by integrating the outputs of the wheel sensors 2 over a predetermined period of time. Therefore, if an accurate current location of the vehicle, i.e., initial location data has been supplied to the location detecting unit 3 before the vehicle starts traveling, the vehicle location thereafter can be obtained. In addition, if a correction value of data based on a tire size change, etc. is supplied to the location detecting unit 3, a more accurate distance traveled by the vehicle can be obtained.

The data representative of the current location of the vehicle obtained by the location detecting unit 3 are supplied to a navigation controller 4 and a memory drive 6. The navigation controller 4 is connected with the memory drive 6, a display 7, and a console 8 with various switches. The navigation controller 4 controls the memory drive 6 on the basis of the location data supplied from the location detecting unit 3 and the selection signal inputted from the console 8. In response to the location data supplied from the location detecting unit 3 and the control signal supplied from the navigation controller 4, the memory drive 6 reads road map data corresponding to a current location out of a map memory 5 constituted by a CD-ROM and outputs the road map data to the navigation controller 4. On the basis of the output from the navigation controller 4, the road map is displayed on the display 7 and a mark indicative of a vehicle's current location is overlapped on the road map.

One feature of the embodiment described above is that the navigation controller 4 is further provided with an external interface 11 through which a memory unit 12 is detachably connected to the controller 4. The memory unit 12, for example, comprises a portable memory unit of the lap-top type. Another feature of the embodiment described above is that the console 8 is provided with a change-over switch 13 for changing over the operating mode of a main body 10 comprising the location detecting unit 3 and the navigation controller 4. The operating mode of the main body 10 consists of a traveling mode and a simulation mode. In response to the changeover of the change-over switch 13, the operating mode of the main body 10 is changed over to the traveling mode or simulation mode.

When, as a result of the change-over of the operating mode, the main body 10 of the navigational system is in its traveling mode and connected with the memory unit 12 through the external interface 11, an accumulation of data into the memory unit 12 is performed in addition to the current-location detecting process described above. That is, the outputs from the gyro 1 and the wheel sensors 2 are stored in the memory unit 12. At this time, the initial location data and the correction data based on a tire size change and the like, which have been supplied to the location detecting unit 3, are also stored in the memory unit 12. Note that the location data and correction data can also be stored in the memory unit 12 through the console 8.

When, on the other hand, the main body 10 was changed over to the simulation mode, the location detecting unit 3 is inhibited from calculating a heading change of the vehicle and a distance traveled by the vehicle on the basis of the outputs from the gyro 1 and the wheel sensors 2. Instead, the data in the memory unit 12 are read out, and the read-out data are supplied to the location detecting unit 3 instead of the gyro data and wheel sensor data. On the basis of these data, the location detecting unit 3 calculates the heading change of the vehicle and the distance traveled by the vehicle. As a result, by maintaining the main body 10 to be in its simulation mode, traveling of a vehicle can be reproduced indoors without actual traveling and a current location detecting process based on the indoor traveling can be reproduced.

Figure 2:
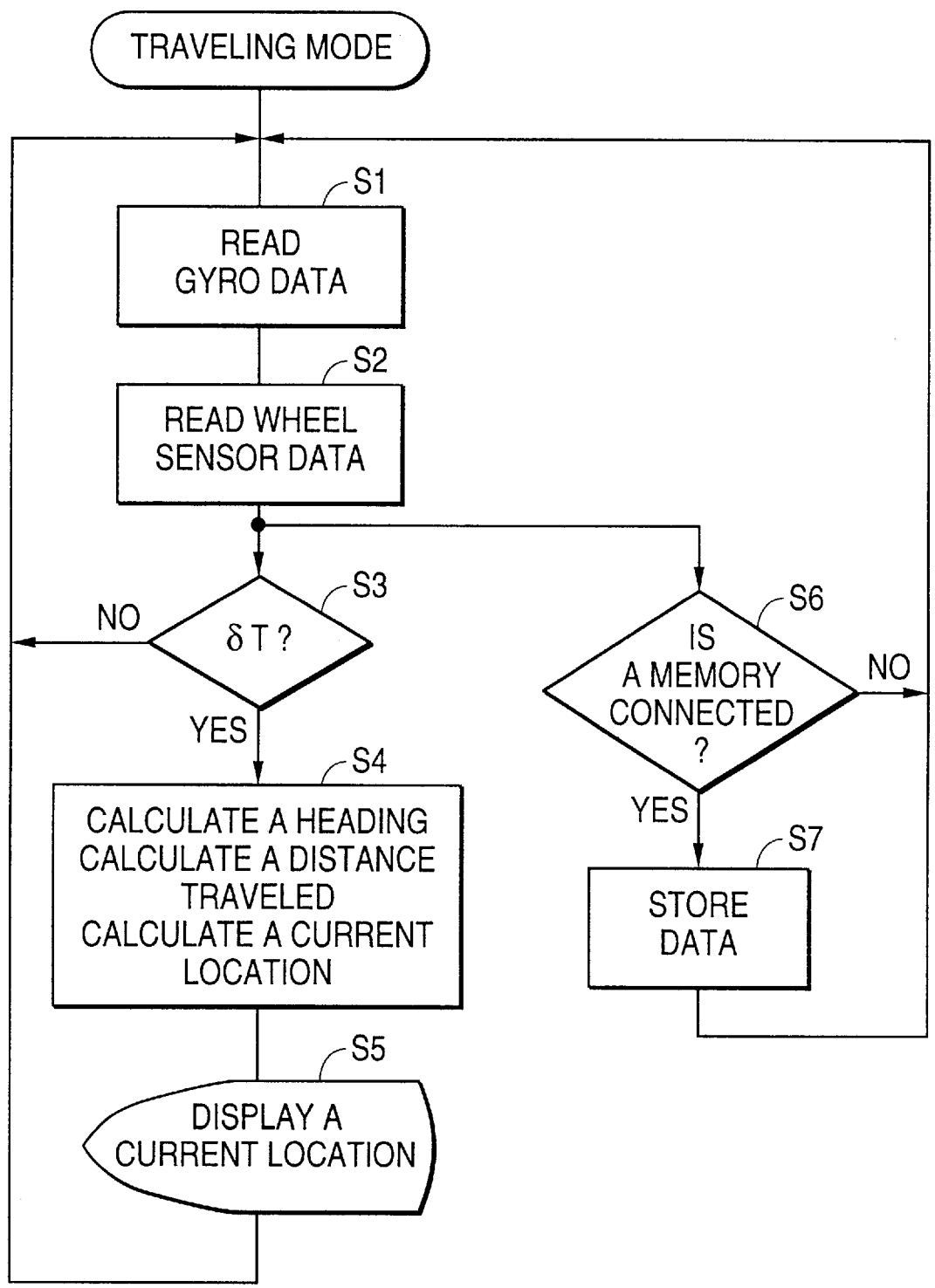
FIG. 2 is a flow chart showing how the traveling mode of the navigational system is operated.

FIG. 2 shows how the traveling mode is operated. In the traveling mode, the detection data of the gyro 1 are read in step S1, and the detection data of the wheel sensors 2 are read in step S2. In step S3, it is determined if measuring time is δt. If YES, a heading change and a distance traveled are calculated and the vehicle's location at that time is calculated in step S4. In step S5, the calculated vehicle's location is displayed on the display 7.

If the detection data of the gyro 1 and the detection data of the wheel sensors 2 are read, writing of the data into the memory unit 12 is performed in parallel with the processes after the step S3. That is, in step S6, it is determined if the memory unit 12 has been connected to the external interface 11, and if YES, writing of the gyro detection data and the wheel-sensor detection data into the memory unit 12 is performed in step S7.

Figure 3:
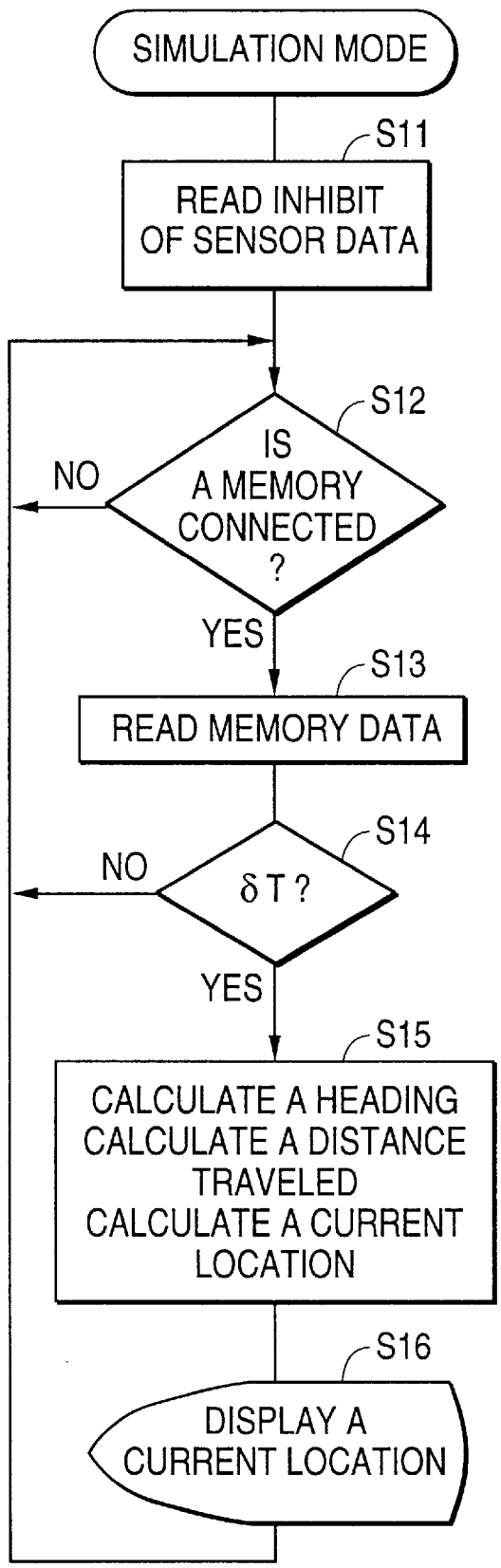
FIG. 3 is a flow chart showing how the simulation mode of the navigational system is operated.

On the other hand, in the simulation mode, the supply of the detection data from the gyro 1 and the wheel sensors 2 to the location detecting unit 3 is inhibited in step S11, as shown in FIG. 3. In step S12, it is determined if the memory unit 12 has been connected to the external interface 11. If YES, the data stored in the memory unit 12 is read out. In step S14, it is determined if measuring time is δt. If YES, a heading change and a distance traveled are calculated on the basis of the read-out data, i.e., data equivalent to the detection data of the gyro 1 and data equivalent to the detection data of the wheel sensors 2, and the vehicle's location at that time is calculated in step S15. In step S16, the calculated vehicle's location is displayed on the display 7.

Whether or not the memory unit 12 has been connected to the external interface 11 is determined on the basis of a signal that is supplied to the navigation controller 4 from the memory unit 12 through the external interface 11 or determined by whether the signal level on the terminal of the external interface 11 goes from high to low or from low to high.

As a result, in the simulation mode, the detection data of the gyro 1 and the detection data of the wheel sensors 2 obtained on actual traveling are supplied from the memory unit 12. Therefore, the navigational system can be operated based on the actual data and an accurate current location of a vehicle can be obtained. For that reason, even when in the traveling mode a current location could not be obtained due to some errors or failure, by changing over the operating mode to the simulation mode in the interior of a room and by supplying the data stored in the memory unit 12 to the location detecting unit 3, actual vehicle traveling can be reproduced and a breakdown of the navigational system can be detected promptly.

While it has been described that the operating mode change-over switch 13 is provided in the console 8, it is noted that it may also be provided in the main body 10. The navigational system may also be constructed such that an operating mode change-over signal is supplied from the memory unit 12. Although the gyro 1 has been used as a heading sensor, a magnetic sensor can be used instead of the gyro. The present invention is also applicable to a navigational system which detects the current location of a vehicle on the basis of absolute location data obtained by a GPS receiver instead of the gyro 1 and wheel sensors 2.

In a location detecting system such as a navigational system, sensor data on actual traveling can be stored in a memory unit in accordance with the present invention. In addition, by the use of the sensor data stored in the memory unit, the traveling state of a moving body can be reproduced indoors even if the moving body does not travel actually. Therefore, since the location detecting system can be operated as occasion demands (e.g., in the stage of development or in the case that a repair is needed), a development in a system or a repair can be performed conveniently. While the subject invention has been described with relation to the preferred embodiment, various modifications and adaptations thereof will now be apparent to those skilled in the art. All such modifications and adaptations as fall within the scope of the appended claims are intended to be covered thereby.

What I claim is:

1. A location detecting system mounted on a vehicle, comprising:

sensor means;

a main body having an operating mode consisting of a traveling mode and a simulation mode and including location detecting means for calculating a current location of said vehicle on the basis of data sensed by said sensor means and further including a navigation controller connected to said location detecting means;

change-over means for changing over said operating mode to said traveling mode or said simulation mode;

storage means detachably connected to said main body;

write means for storing said data sensed by said sensor means into said storage means when said storage means is connected to said main body and also said main body is in said traveling mode;

read means for inhibiting said data sensed by said sensor means from being supplied to said location detecting means and instead supplying the data stored in said storage means to said location detecting means, when said storage means is connected to said main body and also said main body is in said simulation mode; and displaying means for displaying during said traveling mode said current location of said vehicle calculated by said location detecting means, wherein during said simulation mode, said location detecting means calculates a vehicle location based on said data supplied from said storage means, said calculated vehicle location being displayed by said displaying means during said simulation mode.

2. A location detecting system as set forth in claim 1, wherein said sensor means comprises a first unit for sensing a turning angle of said vehicle and a second unit for sensing a speed of said vehicle.

3. A location detecting system as set forth in claim 1, wherein said sensor means comprises a magnetic sensor and wheel sensors.

4. A location detecting system as set forth in claim 1, wherein said sensor means comprises a GPS receiver for sensing an absolute location of said vehicle.

5. A location detecting system as set forth in claim 1, wherein said change-over means is connected to said main body.

6. A location detecting system as set forth in claim 1, wherein said change-over means is provided in said main body.

7. A location detecting system as set forth in claim 1, wherein said change-over means comprises an operating mode change-over signal that is supplied to said main body from said storage means.

\* \* \* \* \*